(12) United States Patent
Ohnishi

(10) Patent No.: US 11,167,569 B2
(45) Date of Patent: Nov. 9, 2021

(54) DYE PRINTING METHOD

(71) Applicant: MIMAKI ENGINEERING CO., LTD., Nagano (JP)

(72) Inventor: Masaru Ohnishi, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 0 days.

(21) Appl. No.: 16/451,024

(22) Filed: Jun. 25, 2019

(65) Prior Publication Data

US 2019/0308424 A1 Oct. 10, 2019

Related U.S. Application Data

(62) Division of application No. 15/505,075, filed as application No. PCT/JP2015/073496 on Aug. 21, 2015, now Pat. No. 10,391,790.

(30) Foreign Application Priority Data

Aug. 21, 2014 (JP) ................... 2014-168864

(51) Int. Cl.
| | |
|---|---|
| *B41J 11/00* | (2006.01) |
| *D06P 1/44* | (2006.01) |
| *D06P 1/52* | (2006.01) |
| *C09D 11/10* | (2014.01) |
| *B41J 3/407* | (2006.01) |
| *D06P 5/20* | (2006.01) |
| *D06P 5/30* | (2006.01) |

(Continued)

(52) U.S. Cl.
CPC ............. *B41J 11/002* (2013.01); *C09D 11/03* (2013.01); *C09D 11/10* (2013.01); *C09D 11/328* (2013.01); *D06P 1/445* (2013.01); *D06P 1/52* (2013.01); *D06P 1/5271* (2013.01); *D06P 1/5278* (2013.01); *D06P 5/2077* (2013.01); *D06P 5/30* (2013.01); *B41J 3/4078* (2013.01)

(58) Field of Classification Search
CPC ....................................................... D09P 5/30
See application file for complete search history.

(56) References Cited

U.S. PATENT DOCUMENTS

| | | | | |
|---|---|---|---|---|
| 4,665,107 A | * | 5/1987 | Micale | ................. C09D 17/001 523/105 |
| 2010/0073408 A1 | * | 3/2010 | Hale | ........................ B41M 7/00 347/5 |

(Continued)

FOREIGN PATENT DOCUMENTS

JP 2014083780 A * 5/2014 ............ B41M 5/382

*Primary Examiner* — Shelby L Fidler
(74) *Attorney, Agent, or Firm* — JCIPRNET

(57) ABSTRACT

A dye printing method and an ink capable of performing printing on more types of media than in the related art are shown. A dye printing method using ink 10 containing a solvent 11, and particles 12 of a thermoplastic resin dispersed in the solvent 11 and containing a dye 13 is characterized by including a printing process of performing a printing on a medium 20 with the ink 10, a particle fixing process of fixing the particles 12 to the medium 20 by drying the solvent 11 of the ink 10 ejected to the medium 20 by the printing process, and a resin fixing process of fixing the thermoplastic resin to the medium 20 by heating the particles 12 fixed to the medium 20 by the particle fixing process, at least at a glass-transition temperature or higher.

4 Claims, 9 Drawing Sheets

(51) Int. Cl.
*C09D 11/03* (2014.01)
*C09D 11/328* (2014.01)

(56) References Cited

U.S. PATENT DOCUMENTS

| | | | | |
|---|---|---|---|---|
| 2014/0347421 | A1* | 11/2014 | Ohnishi | B41J 11/002 347/20 |
| 2014/0354744 | A1* | 12/2014 | Ohnishi | B41J 2/01 347/102 |
| 2015/0153479 | A1* | 6/2015 | Iftime | C09D 11/50 252/586 |
| 2015/0273867 | A1* | 10/2015 | Ohnishi | B41J 11/002 347/102 |
| 2018/0037034 | A1* | 2/2018 | Ohnishi | D06P 5/30 |

* cited by examiner

DYE PRINTING METHOD

CROSS-REFERENCE TO RELATED APPLICATION

This application is a divisional of and claims the priority benefit of U.S. application Ser. No. 15/505,075, filed on Feb. 18, 2017, now allowed. The prior U.S. application Ser. No. 15/505,075 is a 371 application of an International PCT application serial no. PCT/JP2015/073496, filed on Aug. 21, 2015, which claims priority benefit of Japan application no. 2014-168864, filed on Aug. 21, 2014. The entirety of each of the above-mentioned patent applications is hereby incorporated by reference herein and made a part of this specification.

TECHNICAL FIELD

The present invention relates to a dye printing method of performing dyeing with a dye and ink.

BACKGROUND ART

In the related art, as a dye printing method of performing dyeing with a dye, a method of dyeing a fabric with a dye is known (see PTL 1).

CITATION LIST

Patent Literature

PTL 1: Japanese Patent Application Laid-Open No. 2011-42104

SUMMARY OF INVENTION

Technical Problem

However, in the dye printing method of the related art, there is a problem in which the type of ink needs to be changed according to the type of fabric which is a medium to be printed. For example, in a case where a fabric is cotton, it is necessary to use ink containing a reactive dye. Also, in a case where a fabric is silk or wool, it is necessary to use ink containing an acid dye. Also, in a case where a fabric is polyester or nylon, it is necessary to use ink containing a disperse (sublimation) dye. Further, in the dye printing method of the related art, in order to dye a fabric with a dye which is used, it is necessary to add an auxiliary agent and a mordant for promoting dyeing, on the basis of a dye.

Therefore, the present invention provides a dye printing method and ink capable of performing printing on more types of media than in the related art.

Solution to Problem

A dye printing method of the present invention is a dye printing method using ink including a solvent, and particles of a thermoplastic resin dispersed in the solvent and including a dye, and is characterized by including a printing process of performing printing on a medium with the ink, a particle fixing process of fixing the particles to the medium by drying the solvent of the ink ejected to the medium by the printing process; and a resin fixing process of fixing the thermoplastic resin to the medium by heating the particles fixed to the medium by the particle fixing process at least at a glass-transition temperature.

According to this configuration, in the dye printing method of the present invention, since the thermoplastic resin is dyed with the dye, and then is heated at least at the glass-transition temperature or higher, thereby being fixed to media, it is possible to perform printing on media regardless of the types of the media. Therefore, the dye printing method of the present invention can perform printing on more types of media than in the related art.

Also, in the dye printing method of the present invention, the dye may be included in the particles in a state where the dye has not been uniformly dispersed, and the dye printing method may include a dye color developing process of uniformly dispersing the dye by heating, after the particle fixing process.

According to this configuration, in the dye printing method of the present invention, since it is unnecessary to perform heating for uniformly dispersing the dye before start of printing, when the ink is produced, the particles of the thermoplastic resin including the dye can be formed at a low temperature by an emulsion polymerization method, a dissolution suspension method, an ester extension polymerization method, or the like (hereinafter, referred to simply as emulsion polymerization), and the formed particles can be dispersed in the solvent at a low temperature. In other words, the dye printing method of the present invention can lower the production temperature of the ink.

Also, in the dye printing method of the present invention, the particles may include the dye uniformly dispersed therein.

According to this configuration, in the dye printing method of the present invention, since the dye is uniformly dispersed before start of printing, the particles of the thermoplastic resin including the dye do not need to be formed in the procedure of emulsion polymerization or the like when the ink is produced. Therefore, it is possible to facilitate production of the ink.

Ink of the present invention is characterized by a solvent, and particles of a thermoplastic resin dispersed in the solvent and including a dye.

According to this configuration, since the thermoplastic resin is dyed with the dye, and then is heated at least at the glass-transition temperature or higher, thereby being fixed to media, it is possible to perform printing on media with the ink of the present invention, regardless of the types of the media. Therefore, it is possible to use the ink of the present invention to perform printing on more types of media than in the related art.

Also, in the ink of the present invention, the dye may be contained in the particles in which the dye has not been uniformly dispersed.

According to this configuration, since it is unnecessary to perform heating for uniformly dispersing the dye before start of printing, when the ink of the present invention is produced, the particles of the thermoplastic resin including the dye can be formed at a low temperature by emulsion polymerization, and the formed particles can be dispersed in the solvent at a low temperature. In other words, the ink of the present invention can lower the production temperature.

Also, in the ink of the present invention, the particles may include the dye uniformly dispersed therein.

According to this configuration, since the dye is uniformly dispersed before start of printing, the particles of the thermoplastic resin including the dye do not need to be formed in the procedure of emulsion polymerization or the like when the ink is produced. Therefore, it is possible to facilitate production of the ink of the present invention.

Also, the ink of the present invention may contain small particles of a thermoplastic resin dispersed in the solvent and having a particle diameter smaller than that of the particles.

According to this configuration, in the ink of the present invention, since the small particles are disposed between the particles dispersed in the solvent, whereby it is possible to reduce the concentration of the solvent, it is possible to increase the viscosity by vaporization of a smaller amount of solvent. Therefore, it is possible to more quickly suppress bleeding of the ink of the present invention ejected to media.

Also, in the ink of the present invention, the small particles may have a glass-transition point lower than that of the particles.

According to this configuration, in the ink of the present invention, since the mixture of the particles fixed to a medium and the small particles is thermally plasticized at a temperature lower than the glass-transition point of the particles, it is possible to lower a temperature at which it is possible to fix the thermoplastic resin particles to a medium.

Also, in the ink of the present invention, the small particles may be dyed in a color identical or similar to the color of the particles including the dye uniformly dispersed therein.

According to this configuration, since it is possible to suppress the dyeing concentration of a result of printing using the dye included in the particles from decreasing due to the color of the small particles, the ink of the present invention becomes high-concentration ink.

Advantageous Effects of Invention

The dye printing method and the ink of the present invention can perform printing on more types of media than in the related art.

DESCRIPTION OF EMBODIMENTS

Hereinafter, embodiments of the present invention will be described with reference to drawings.

First Embodiment

First, materials which are used in a dye printing method according to a first embodiment of the present invention will be described.

In the dye printing method according to the present embodiment, media and ink for performing printing on media are used.

<Media>

Media are formed of fabrics made from fibers of cotton, silk, wool, polyester, nylon, polyethylene terephthalate, or the like. Media may be formed of materials other than fabrics. For example, media may be formed of wood, stainless steel, brass, glass, and so on.

<Ink>

Figure 1:
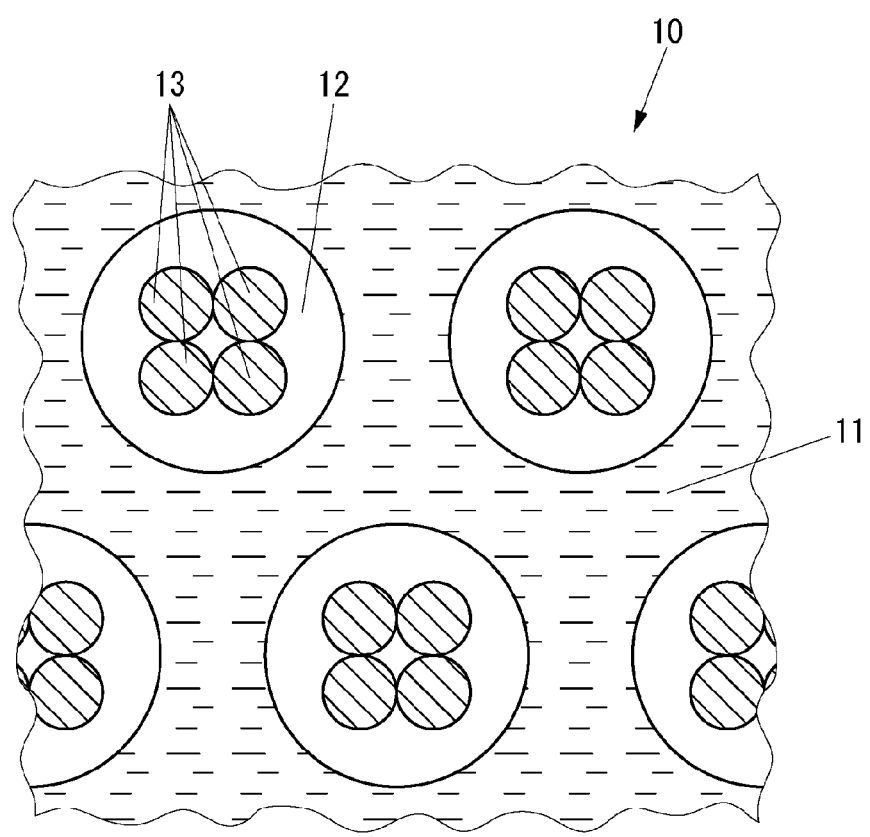
FIG. 1 is a view schematically illustrating the composition of ink which is used in a dye printing method according to a first embodiment of the present invention.

FIG. 1 is a view schematically illustrating the composition of ink 10 which is used in the dye printing method according to the present embodiment.

As shown in FIG. 1, the ink 10 contains a solvent 11 composed of water, a dissolving agent, and dispersants, and particles 12 of a thermoplastic resin dispersed in the solvent 11.

(Solvent)

(Dissolving Agent)

As examples of the dissolving agent, the followings can be taken. It is possible to use a hydrocarbon-based dissolving agent, an ester-based dissolving agent, a ketone-based dissolving agent, an alcohol-based dissolving agent, a glycol-based dissolving agent, or the like.

As examples of the hydrocarbon-based dissolving agent, n-hexane, n-heptane, n-octane, isooctane, cyclohexane, methylcyclohexane, benzene, toluene, o-xylene, m-xylene, p-xylene, ethylbenzene, and so on can be taken.

As examples of the ester-based dissolving agent, propyl formate, n-butyl formate, isobutyl formate, amyl formate, ethyl acetate, n-propyl acetate, isopropyl acetate, n-butyl acetate, isobutyl acetate, sec-butyl acetate, n-amyl acetate, isoamyl acetate, methyl isoamyl acetate, sec-hexyl acetate, methyl propionate, ethyl propionate, n-butyl propionate, methyl butyrate, ethyl butyrate, methyl lactate, and so on can be taken.

As examples of the ketone-based dissolving agent, methyl ethyl ketone, methyl n-propyl ketone, methyl n-butyl ketone, methyl isobutyl ketone, diethyl ketone, ethyl n-butyl ketone, di-n-propyl ketone, mesityl oxide, and so on can be taken.

As alkylene-glycol-based dissolving agents, there are dissolving agents represented by the following general formulae (a) to (c).

$$R1CO(OR2)ZOR3 \tag{a}$$

$$R4CO(OR5)ZOCOR6 \tag{b}$$

$$R7(OR8)ZOR9 \tag{c}$$

(In these formulae, R2, R5, R8 are independent from one another and represent ethylene groups or propylene groups, and R1, R3, R4, and R6 are independent from one another and represent alkyl groups with carbon numbers between 1 to 4, and R7 and R9 are independent from one another and represent hydrogen atoms or alkyl groups with carbon numbers between 1 to 4, and Z represents an integer between 1 to 4.)

As dissolving agents corresponding to the general formula (a), there are glycol monoacetates such as ethylene glycol monomethyl ether acetate, ethylene glycol monoethyl ether acetate, ethylene glycol monobutyl ether acetate, diethylene glycol monomethyl ether acetate, diethylene glycol monoethyl ether acetate, diethylene glycol monobutyl ether acetate, propylene glycol monomethyl ether acetate, dipropylene glycol monomethyl ether acetate, ethylene glycol monomethyl ether propionate, ethylene glycol monoethyl ether propionate, ethylene glycol monobutyl ether propionate, diethylene glycol monomethyl ether propionate, diethylene glycol monoethyl ether propionate, diethylene glycol monobutyl ether propionate, propylene glycol monomethyl ether propionate, dipropylene glycol monomethyl ether propionate, ethylene glycol monomethyl ether butyrate, ethylene glycol monoethyl ether butyrate, ethylene glycol monobutyl ether butyrate, diethylene glycol monomethyl ether butyrate, diethylene glycol monoethyl ether butyrate, diethylene glycol monobutyl ether butyrate, propylene glycol monomethyl ether butyrate, and dipropylene glycol monomethyl ether butyrate.

As dissolving agents corresponding to the general formula (b), there are glycol diacetates such as ethylene glycol diacetate, diethylene glycol diacetate, propylene glycol diacetate, dipropylene glycol diacetate, ethylene glycol acetate propionate, ethylene glycol acetate butyrate, ethylene glycol propionate butyrate, ethylene glycol dipropionate, ethylene glycol dibutyrate, diethylene glycol acetate propionate, diethylene glycol butyrate, diethylene glycol propionate butyrate, diethylene glycol dipropionate, diethylene glycol dibutyrate, propylene glycol acetate propionate, propylene glycol acetate butyrate, propylene glycol propionate butyrate, propylene glycol dipropionate, propylene glycol dibutyrate, dipropylene glycol acetate propionate, dipropylene glycol acetate butyrate, dipropylene glycol propionate butyrate, dipropylene glycol dipropionate, and dipropylene glycol dibutyrate.

As dissolving agents corresponding to the general formula (c), there are glycols, such as ethylene glycol, diethylene glycol, triethylene glycol, propylene glycol, and dipropylene glycol, and glycol ethers, such as ethylene glycol monobutyl ether, propylene glycol monomethyl ether, propylene glycol monobutyl ether, diethylene glycol monoethyl ether, diethylene glycol diethyl ether, diethylene glycol monobutyl ether, diethylene glycol dibutyl ether, diethylene glycol methyl ethyl ether, dipropylene glycol monomethyl ether, dipropylene glycol monoethyl ether, dipropylene glycol monobutyl ether, propylene glycol n-propyl ether, triethylene glycol monomethyl ether, triethylene glycol monoethyl ether, triethylene glycol monobutyl ether, tripropylene glycol monomethyl ether, tetraethylene glycol dimethyl ether, and tetraethylene glycol diethyl ether.

(Dispersants)

The dispersants are used to stabilize dispersion of the thermoplastic resin. The dispersants are not limited to specific materials, and may be any other materials having effects of separating particles and preventing agglomeration of the separated particles. In the present embodiment, a low-molecular-weight surfactant and a high-molecular-weight surfactant were used.

As the low-molecular-weight surfactant, any one of anionic surfactants having carboxyl groups or sulfate groups, cationic surfactants having amine groups, ether type surfactants, ester type non-ionic surfactants is used.

(Ratio of Components of Solvent)

It is preferable that the weight ratio of water and the dissolving agent which are contained in the solvent 11 be between 7:1 to 1:5.

(Particles of Thermoplastic Resin)

Particles 12 of a thermoplastic resin are formed of a resin dyeable with a disperse dye or a sublimation dye. As the thermoplastic resin, polyester or nylon can be used. The particles 12 of the thermoplastic resin include a dye 13.

(Dye)

The dye 13 is a disperse dye or a sublimation dye. The dye 13 is included in the particles 12 in a state where the dye is at the molecular level and has not been uniformly dispersed. In other words, the dye 13 is included in the particles 12 in a state where its color has not been completely developed, such as a state where its color has not been developed, or a state where its color has been incompletely developed. The average particle diameter of the dye 13 may be 100 nm or smaller, preferably, 50 nm or smaller, such that the dye can be uniformly dispersed in a resin fixing process to be described below.

The dye 13 is not limited as long as it is a dye capable of dyeing a polyester copolymer of polyester with acryl, urethane, or the like. For example, as disperse dyes, there are the followings.

(1) Benzene-Azo-Based Dyes (Monoazo Dyes, Disazo Dyes, and Naphthalene Azo Dyes)

There are many monoazo dyes relatively inexpensive due to the costs of intermediates and the cost for synthesis, and there are many secure monoazo dyes having high fastness to sublimation. Monoazo dyes are mainly used for neutral and deep colors. Their color ranges are wide, and thus yellow, orange, red, ruby, and blue can be obtained. Since each dye molecule of disazo dyes has two azo groups (—N═N—) which are chromophores, there are many relatively inexpensive disazo dyes having high color values and vivid colors. Since there are many disazo dyes whose fastness to moistness tends to easily deteriorate due to a thermal process after dyeing, disazo dyes are mainly used in fields in which the fastness is not considered as important.

(2) Anthraquinone-Based Dyes

Since anthraquinone-based dyes have dye migration properties relatively better than those of dyes based on other materials and are chemically stable, anthraquinone-based dyes are mainly used in fields in which level dyeing, covering, and reproducibility are required. Since anthraquinone-based dyes have vivid colors (particularly, vivid blue and red) and have excellent color fastness to light, many anthraquinone-based dyes are used for car seats. On the other side, since anthraquinone-based dyes have disadvantages in which it is difficult to achieve color values and fastness to moistness and are expensive, anthraquinone-based dyes are often used for light colors and neutral colors. Since anthraquinone-based dyes change to blue colors if forming chelate bonds with metal ions, it is required to use sequestering agents. Chromatically, many anthraquinone-based dyes have vivid red, violet, and blue colors (3) Heterocyclic-Azo-Based Dyes (Such as Thiazole Dyes, Benzothiazole Dyes, Quinoline Dyes, Pyridone Dyes, Imidazole Dyes, and Thiophene Dyes)

Since heterocyclic-azo-based dyes have features such as vivid colors, large molecular extinction coefficients, high color values, and a feature in which discharge printing is possible, as compared to benzene-azo-based dyes, recently, heterocyclic-azo-based dyes have been developed in the disperse dye field. Thiophene-azo-based blue dyes and disazo blue dyes having structures relatively newly developed are useful as dyes having vivid colors or high fastness.

(4) Benzodifuranone-Based Dyes

Benzodifuranone-based dyes are known as dyes having features in which they have vivid color of red although they contain no nitrogen atoms in their structures and having the lowest degree of so-called thermomigration (representing a phenomenon in which dyes migrate to the surfaces of fibers by a thermal process or the like after dyeing, resulting in deterioration in fastness to moistness). Since benzodifuranone-based dyes have a feature in which they easily hydrolyze under an alkali condition, they can be used as dyes for alkali discharge printing.

(5) Others (Condensed Dyes Such as Quinophthalone Dyes, Styryl Dyes, and Coumarin Dyes)

Coumarin-based virescent yellow disperse dyes having fluorescent colors are well-known. Also, as sublimation transfer dyes, there are azo dyes, anthraquinone dyes, quinophthalone dyes, styryl dyes, oxazine dyes, xanthene dyes, methine dyes, azomethine dyes, and so on. From among these, as examples of yellow disperse dyes, dyes whose names are C.I. Disperse Yellow 51, 54, 60, 64, 65, 71, 82, 98, 114, 119, 160, 201, 211, and the like can be taken. As examples of orange disperse dyes, dyes whose names are C.I. Disperse Orange 25, 33, 44, 288, and the like can be taken. As examples of red disperse dyes, dyes whose names are C.I. Disperse Red 4, 22, 55, 59, 60, 73, 86, 91, 146, 152, 191, 302, 364, and the like can be taken. As examples of blue disperse dyes, dyes whose names are C.I. Disperse Blue 14, 28, 56, 60, 72, 73, 77, 334, 359, 360, 366, and the like can be taken. As examples of dyes having other colors, a dye whose name is C.I. Disperse Brown 27, dyes whose names are C.I. Disperse Violet 26, 27, 28, and the like can be taken. Besides the above-described dyes, as oil-soluble dyes, there are dyes whose names are C.I. Solvent Yellow 16, 33, 93, and 160, a dye whose name is C.I. Solvent Orange 60, dyes whose names are C.I. Solvent Red 111 and 115, a dye whose name is C.I. Solvent Violet 31, dyes whose names are C.I. Solvent Blue 35, 36, 59, 63, 97, and 104, and the like.

Also, as examples of sublimation dyes, the followings can be taken.

There are azo dyes, anthraquinone dyes, quinophthalone dyes, styryl dyes, oxazine dyes, xanthene dyes, methine dyes, azomethine dyes, and so on.

From among these, as examples of yellow disperse dyes, dyes whose names are C.I. Disperse Yellow 51, 54, 60, 64, 65, 71, 82, 98, 114, 119, 160, 201, 211, and the like can be taken.

As examples of orange disperse dyes, dyes whose names are C.I. Disperse Orange 25, 33, 44, 288, and the like can be taken.

As examples of red disperse dyes, dyes whose names are C.I. Disperse Red 4, 22, 55, 59, 60, 73, 86, 91, 146, 152, 191, 302, 364, and the like can be taken.

As examples of blue disperse dyes, dyes whose names are C.I. Disperse Blue 14, 28, 56, 60, 72, 73, 77, 334, 359, 360, 366, and the like can be taken.

As examples of dyes having other colors, a dye whose name is C.I. Disperse Brown 27, dyes whose names are C.I. Disperse Violet 26, 27, 28, and the like can be taken.

Besides the above-described dyes, as examples of oil-soluble dyes, dyes whose names are C.I. Solvent Yellow 16, 33, 93, and 160, a dye whose name is C.I. Solvent Orange 60, dyes whose names are C.I. Solvent Red 111 and 115, a dye whose name is C.I. Solvent Violet 31, dyes whose names are C.I. Solvent Blue 35, 36, 59, 63, 97, and 104, and the like can be taken.

In a case where the dye 13 is a chelate dye which is a disperse dye, since the dye is vulnerable to light, it is possible to mix a metallic salt with the dye, thereby chelating the dye, such that light resistance is improved.

A compound of an azo dye and metal cations is used, and the chelate-forming reaction thereof is used, and excellent weather resistance of a dye-metal complex which is generated by the chelate reaction is used. As examples of the metal which is mixed, nickel, copper, and cobalt can be taken.

(Ink Producing Method)

Now, a method of producing the ink 10 will be described.

The thermoplastic resin including the dye is produced, for example, at a low temperature lower than 100° C., by emulsion polymerization, suspension polymerization, or a dissolution suspension method, whereby the particles 12 are formed.

The dispersants and a disperse-dye fine-particle dispersion liquid are mixed with a polyester-based fine-particle dispersion liquid produced by emulsion polymerization, and an agglomerating agent or an electrolyte is added, and the mixture is stirred such that agglomerated particles having a predetermined size are formed, whereby a particle dispersion liquid is obtained. A surface tension adjuster, a viscosity adjuster, a PH adjuster, and so on are added, whereby the ink is produced.

As the emulsion polymerization, the suspension polymerization, or the dissolution suspension method, a well-known method can be used. For example, in the emulsion polymerization, a monomer having vinyl groups and insoluble in water is used. This monomer is dispersed in water by a surfactant. This dispersion liquid is polymerized by adding a polymerization initiator soluble in water, such as potassium peroxodisulfate or hydrogen peroxide.

Further, the ink 10 is produced by dispersing the formed particles 12 in the solvent 11, for example, at a low temperature lower than 100° C.

The volume ratio of the particles 12 in the ink is 5% to 40% by volume in the ink, preferably, 10% to 30% by volume.

<Inkjet Printer>

Now, the configuration of an inkjet printer which is used in the dye printing method according to the present embodiment will be described.

Figure 2:
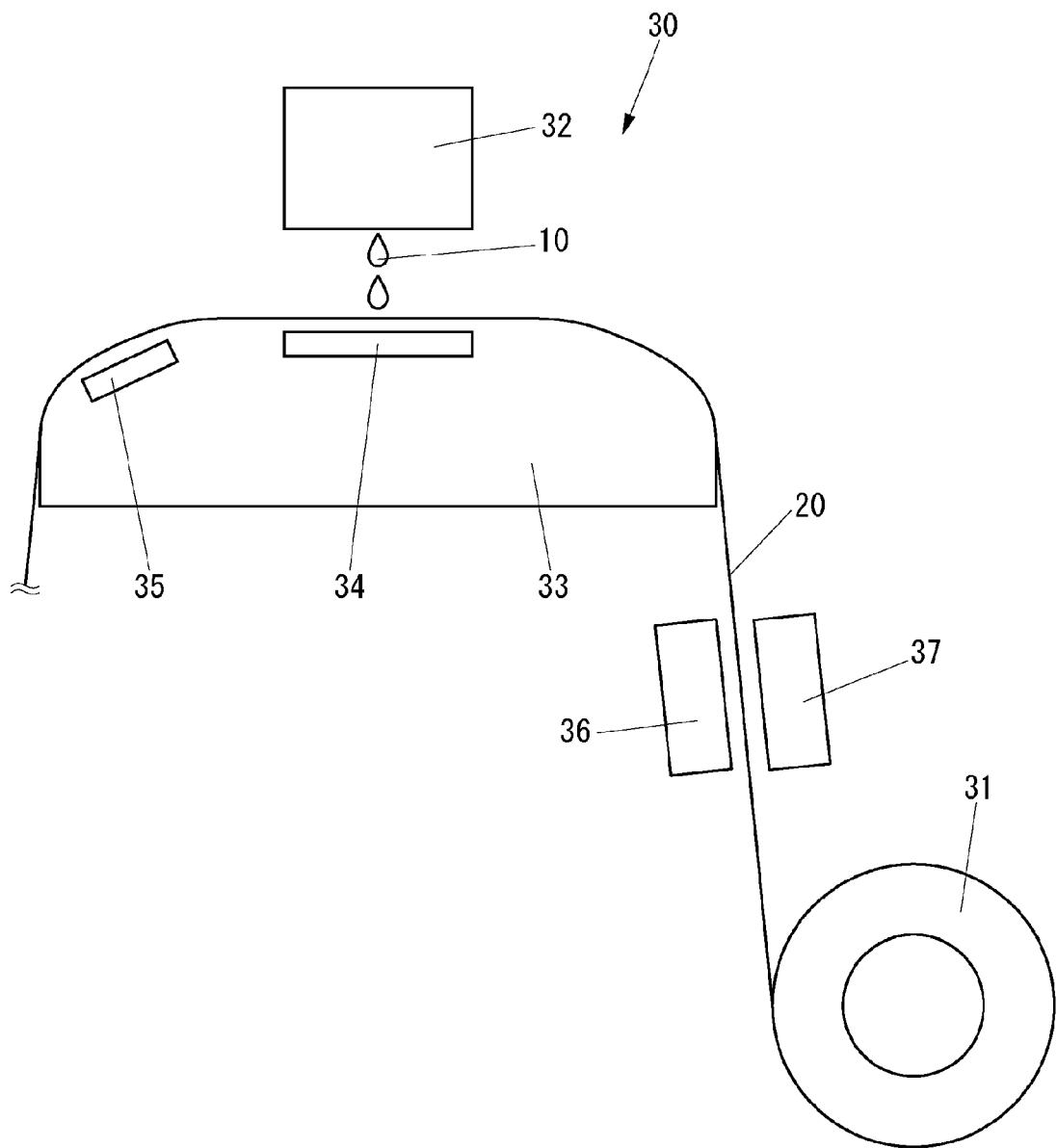
FIG. 2 is a view illustrating a rough configuration of an inkjet printer which is used in the dye printing method according to the first embodiment of the present invention.

FIG. 2 is a view illustrating a rough configuration of an inkjet printer 30 which is used in the dye printing method according to the present embodiment.

As shown in FIG. 2, the inkjet printer 30 includes a conveyance device 31 for conveying a medium 20, an inkjet head 32 for ejecting the ink 10 toward the medium 20, a platen 33 disposed so as to face the inkjet head 32 and configured to support the medium 20, a print heater 34 disposed so as to face the inkjet head 32 and configured to heat the medium 20, for example, at 50° C., a pre-heater 35 for pre-heating the medium 20, for example, at 40° C. before the medium is heated by the print heater 34, and an after-heater 36 and a fan heater 37 for heating the medium 20, for example, between 100° C. and 200° C. after the medium is heated by the print heater 34. However, the inkjet printer 30 may have a configuration having only one of the after-heater 36 and the fan heater 37.

Also, the inkjet printer 30 may have an infrared lamp for heating the medium 20, in place of the fan heater 37.

<Dye Printing Method>

Now, the dye printing method according to the present embodiment will be described.

Figure 3:
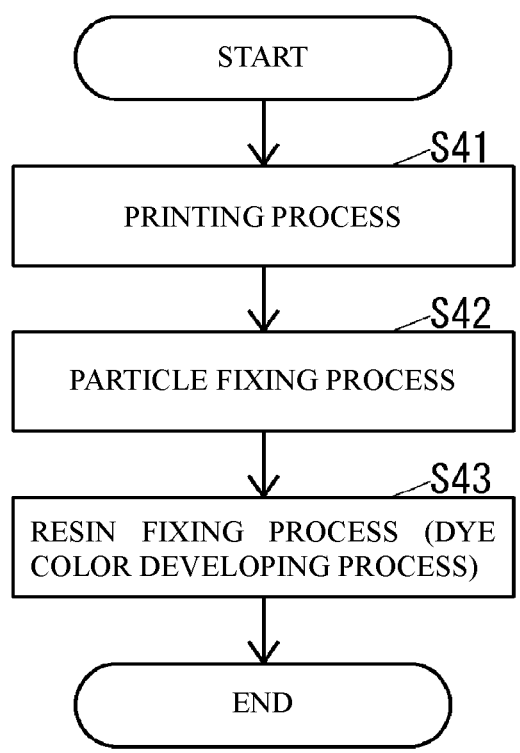
FIG. 3 is a flow chart of the dye printing method according to the first embodiment of the present invention.

FIG. 3 is a flow chart of the dye printing method according to the present embodiment.

As shown in FIG. 3, the dye printing method according to the present embodiment includes a printing process (S41) of performing printing on a medium 20 with the ink 10, a particle fixing process (S42) of fixing the particles 12 to the medium 20 by drying the solvent 11 of the ink 10 ejected by the printing process, and a resin fixing process (S43) of fixing the thermoplastic resin constituting the particles 12 by temporarily liquefying the particles 12 fixed to the medium 20 by the particle fixing process by heating.

Also, the resin fixing process of S43 serves as a dye color developing process of uniformly dispersing the dye 13 by heating.

Figure 4A:
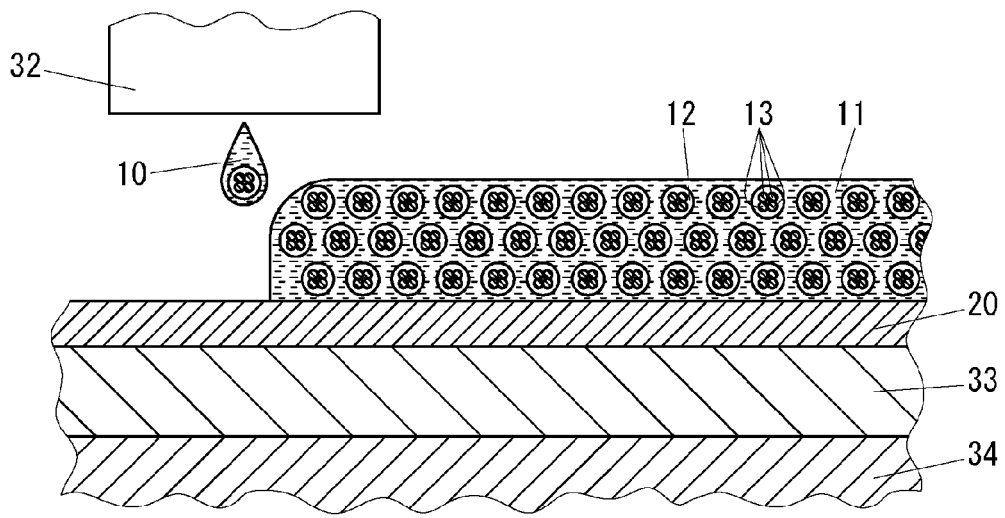
FIG. 4A to 4C are side views illustrating a medium at different time points in the dye printing method shown in FIG. 3.
Figure 4B:
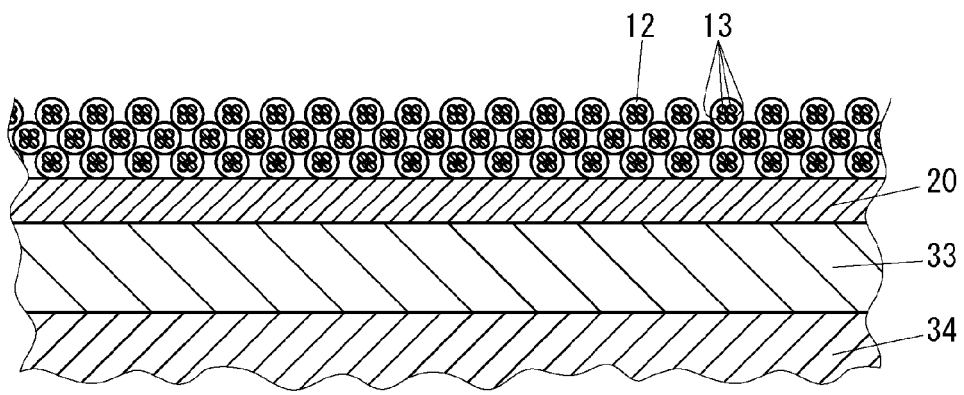
Figure 4C:
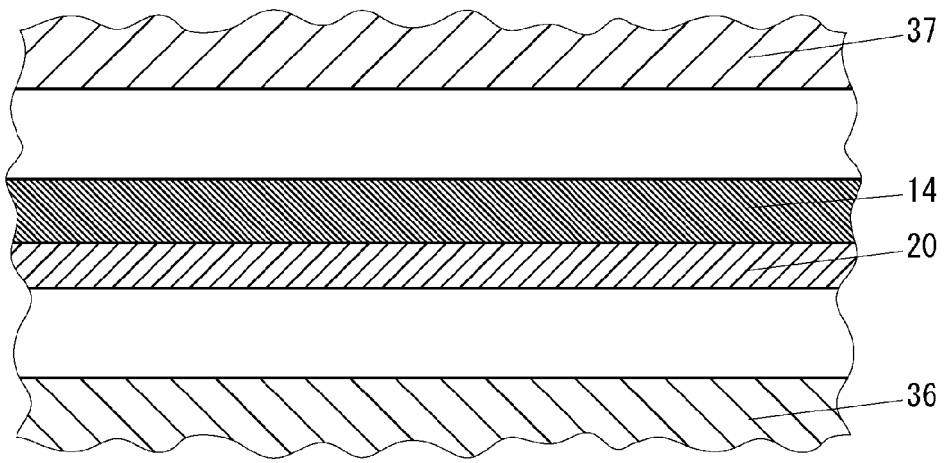

FIG. 4A to 4C are side views of the medium 20 at different time points in the dye printing method according to the present embodiment.

First, the printing process of S41 will be described.

In printing process of S41, first, as shown in FIG. 4A, printing is performed on the medium 20 with the ink 10 by the inkjet head 32.

Now, the particle fixing process of S42 will be described.

In the particle fixing process of S42, the medium 20 subjected to printing with ink 10 is heated by the print heater 34, whereby the solvent 11 of the ink 10 is vaporized, whereby the medium is dried. Therefore, the particles 12 are fixed to the medium 20 as shown in FIG. 4B. In the state shown in FIG. 4B, since the solvent 11 has been vaporized, the viscosity of the ink 10 is suddenly increased, whereby the particles 12 are suppressed from spreading along the medium 20.

Now, the resin fixing process of S43 will be described.

In the resin fixing process of S43, the medium 20 having the particles 12 fixed thereto is heated between 100° C. and 200° C. by the after-heater 36 and the fan heater 37 for about several minutes to several tens minutes, whereby the particles 12 fixed to the medium 20 are temporarily liquefied by the heating and the dye 13 is uniformly dispersed by the heating. Here, if the particles 12 fixed to the medium 20 are liquefied, the thermoplastic resin constituting the particles 12 is re-solidified by cooling, thereby being fixed to the medium 20. Therefore, on the medium 20, as shown in FIG. 4C, a color development layer 14 is formed of the thermoplastic resin dyed by the dye 13.

Now, the heating temperature of the after-heater 36 will be described. The glass-transition temperature of the dye 13 is higher than the glass-transition temperature of the thermoplastic resin. A dyeing temperature which is a temperature at which the thermoplastic resin is dyed with the dye 13 is higher than the glass-transition temperature of the dye 13. The sublimation temperature of the dye 13 is higher than the dyeing temperature of the dye 13. The temperature of the after-heater 36 is set to be equal to or higher than the dyeing temperature of the dye 13 and be lower than the sublimation temperature of the dye 13. Also, as the thermoplastic resin, a thermoplastic resin having a glass-transition temperature lower than the dyeing temperature of the dye 13 is selected.

As described above, since the thermoplastic resin is dyed with the dye 13, and then is temporarily liquefied by heating, thereby being fixed to a medium 20, the dye printing method according to the present embodiment can perform printing on media 20 regardless of the types of the media 20. Therefore, the dye printing method according to the present embodiment can perform printing on more types of media 20 than in the related art.

Also, in the dye printing method of the related art, the type of ink needs to be changed according to the type of a fabric which is a medium to be printed, and it is also necessary to perform a pretreatment process on fabrics with a pretreatment agent before printing. For example, in a case where a fabric is cotton, it is necessary to perform a pretreatment process with a bleeding preventing agent such as starch or alginate and a reactive dye mordant (an auxiliary agent).

Also, in a case where a fabric is silk or wool, it is necessary to perform a pretreatment process with a bleeding preventing agent and an acid dye mordant (an auxiliary agent). Also, in a case where a fabric is polyester or nylon, it is necessary to perform a pretreatment process with a bleeding preventing agent.

However, in the dye printing method according to the present embodiment, since the thermoplastic resin is dyed with the dye 13, and then is temporarily liquefied by heating, thereby being fixed to a medium 20, a pretreatment process using a pretreatment agent is unnecessary, unlike in the dye printing method of the related art. Therefore, as compared to methods in which pretreatment processes are performed, the dye printing method according to the present embodiment can reduce the total time of processing, and can reduce the cost by the cost of a pretreatment agent for a pretreatment process. Further, since any pretreatment agent is not used, the dye printing method according to the present invention does not need a process of washing a pretreatment agent out.

In the dye printing method according to the present embodiment, since it is unnecessary to perform heating for uniformly dispersing the dye 13 before start of printing, when the ink 10 is produced, the particles 12 of the thermoplastic resin including the dye 13 can be formed at a low temperature by emulsion polymerization, and the formed particles 12 can be dispersed in the solvent 11 at a low temperature. In other words, the dye printing method according to the present embodiment can lower the production temperature of the ink 10.

The ink 10 which is used in the dye printing method according to the present embodiment contains the particles 12 of the thermoplastic resin including the dye 13, as compared to a configuration in which the dye 13 is directly dispersed in the solvent 11, the degree of freedom of movement of the dye 13 in the solvent 11 is low. Therefore, the dye printing method according to the present embodiment can suppress the dye 13 from spreading into a medium 20 together with the solvent of the ink 10 ejected to the medium 20, and can obtain a printed result with high accuracy and high concentration.

Also, in the dye printing method according to the present embodiment, since dyeing is performed with the dye 13 which is more transparent than pigments and is highly vivid, it is possible to obtain highly vivid printed results as compared to methods of performing dyeing with pigments.

Also, in the dye printing method according to the present embodiment, for example, even in a case where a fabric is used as a medium 20, since a color development layer 14 is formed of the thermoplastic resin on the surface of the fabric without dyeing the inside of the fabric, it is possible to obtain a highly vivid printed result with high concentration.

Also, since the dye printing method according to the present embodiment does not need to include a pressing process, it is possible to perform printing even on media 20 on which printing is difficult in a case of including a pressing process, such as various plastic films, plates, and three-dimensional objects.

However, the dye printing method according to the present embodiment can also press a medium 20 having a color development layer 14 formed thereon with a roller and the like, thereby flattening the surface of the color development layer, thereby capable of obtaining gloss by the color development layer 14.

Also, the resin fixing process of S43 is performed in the inkjet printer 30 in the present embodiment; however, it may be performed by a device different from the inkjet printer 30 after a medium 20 is taken out of the inkjet printer 30.

Also, the particle fixing process of S42 may be performed by a device different from the inkjet printer 30 after a medium 20 is taken out of the inkjet printer 30.

Second Embodiment

First, materials which are used in a dye printing method according to a second embodiment of the present invention will be described.

The dye printing method according to the present embodiment is different from the dye printing method according to the first embodiment, in ink which is used.

<Ink>

Figure 5:
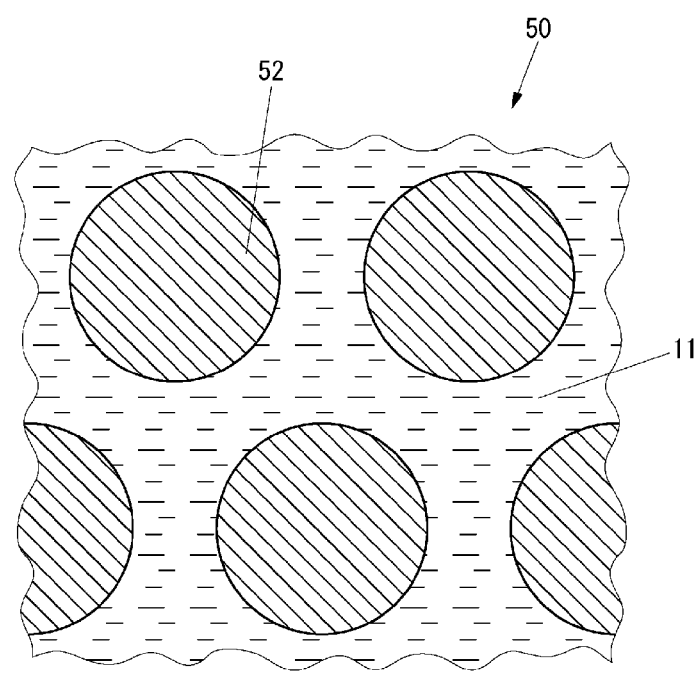
FIG. 5 is a view schematically illustrating the composition of ink which is used in a dye printing method according to a second embodiment of the present invention.

FIG. 5 is a view schematically illustrating the composition of ink 50 which is used in the dye printing method according to the present embodiment.

As shown in FIG. 5, the ink 50 contains a solvent 11 composed of water, a dissolving agent, and dispersants, and particles 52 of a thermoplastic resin dispersed in the solvent 11. The water, the solvent, and the dispersants are identical to the water, the solvent, and the dispersants of the first embodiment.

(Dyed Particles)

The particles 52 are dyed with a dye. As the thermoplastic resin constituting the particles 52, resins dyeable with the dye, such as polyester and nylon, can be used.

The dye with which the particles 52 are dyed is a disperse dye or a sublimation dye.

As the dye with which the particles 52 are dyed, the dye of the first embodiment can be used.

Now, a method of producing the ink 50 will be described.

The dye is dispersed in the thermoplastic resin liquefied by heating while the dye is uniformly dispersed by heating, whereby it is possible to obtain the thermoplastic resin dyed with the dye. Thereafter, the thermoplastic resin dyed with the dye is cooled and is grinded, thereby being powderized, whereby it is possible to form the particles 52 in which color development has been completed.

Thereafter, the formed particles 52 are dispersed in a solvent 11, whereby the ink 50 is produced.

Also, as a method of producing the particles 52 in which color development has been completed, besides the above-described method, any other method may be used. For example, it is also possible to grind a polyester resin in which color development has been completed, thereby powderizing the polyester resin, whereby it is possible to obtain the particles 52 in which color development has been completed.

The particle diameter of the particles 52 is between 30 nm and 700 nm, preferably between 100 nm and 500 nm.

<Dye Printing Method>

Now, the dye printing method according to the present embodiment will be described.

Figure 6:
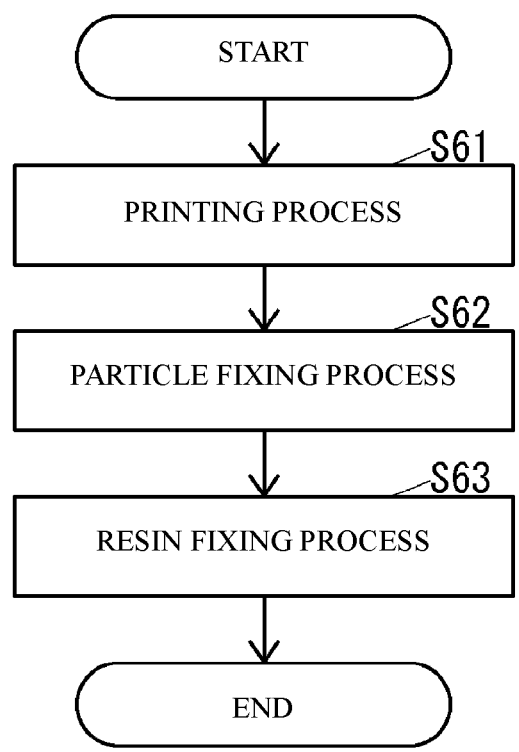
FIG. 6 is a flow chart of the dye printing method according to the second embodiment of the present invention.

FIG. 6 is a flow chart of the dye printing method according to the present embodiment.

As shown in FIG. 6, the dye printing method according to the present embodiment includes a printing process (S61) of performing printing on a medium 20 with the ink 50, a particle fixing process (S62) of fixing the particles 52 to the medium 20 by drying the solvent 11 of the ink 50 ejected to the medium 20 by the printing process, and a resin fixing process (S63) of fixing the thermoplastic resin constituting the particles 52 to the medium 20 by temporarily liquefying the particles 52 fixed to the medium 20 by the particle fixing process by heating.

Figure 7A:
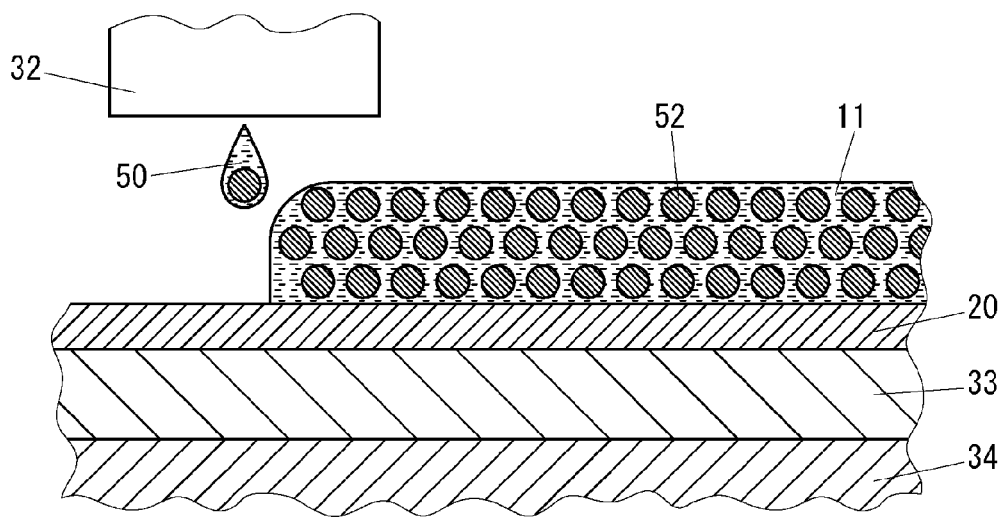
FIG. 7A to 7C are side views illustrating a medium at different time points in the dye printing method shown in FIG. 6.
Figure 7B:
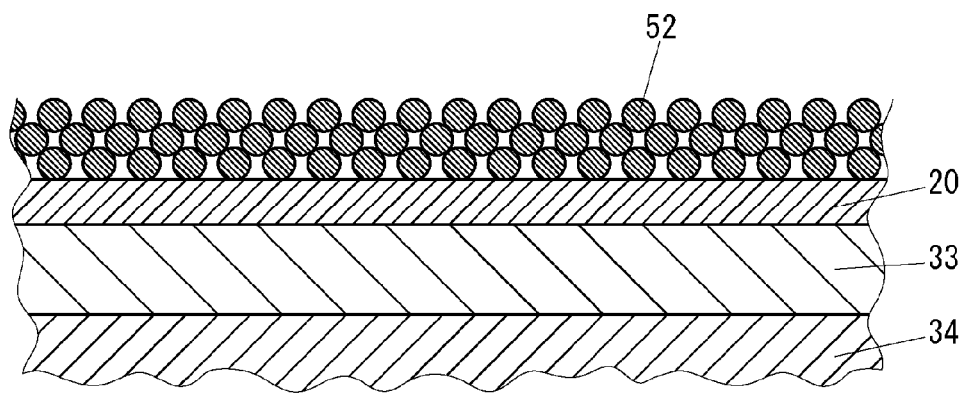
Figure 7C:
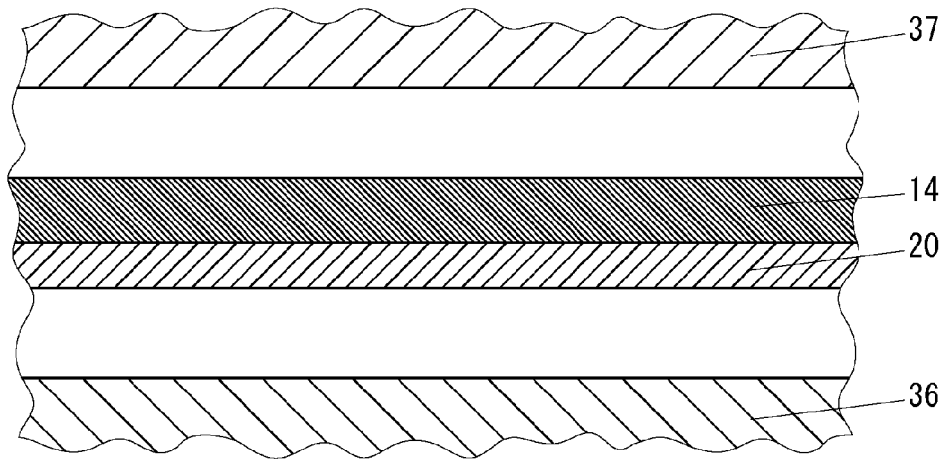

FIG. 7A to 7C are side views of the medium 20 at different time points in the dye printing method according to the present embodiment.

First, the printing process of S61 will be described.

In printing process of S61, first, as shown in FIG. 7A, printing is performed on the medium 20 with the ink 50 by the inkjet head 32.

Now, the particle fixing process of S62 will be described.

In the particle fixing process of S62, the medium 20 subjected to printing with ink 50 is heated by the print heater 34, whereby the solvent 11 of the ink 50 is vaporized, whereby the medium is dried. Therefore, the particles 52 are fixed to the medium 20 as shown in FIG. 7B. In the state shown in FIG. 7B, since the solvent 11 has been vaporized, the particles 52 are suppressed from spreading along the medium 20.

Now, the resin fixing process of S63 will be described.

In the resin fixing process of S63, the medium 20 having the particles 52 fixed thereto is heated between 100° C. and 200° C. by the after-heater 36 and the fan heater 37 for about several minutes to several tens minutes, whereby the particles 52 fixed to the medium 20 are temporarily liquefied by the heating.

Here, if the particles 52 fixed to the medium 20 are liquefied, the thermoplastic resin constituting the particles 52 are re-solidified by cooling, thereby being fixed to the medium 20. Therefore, on the medium 20, as shown in FIG. 7C, a color development layer 14 is formed of the thermoplastic resin dyed with the dye.

Now, the heating temperature of the after-heater 36 will be described. The glass-transition temperature of the dye 13 is higher than the glass-transition temperature of the thermoplastic resin. A dyeing temperature which is a temperature at which the thermoplastic resin is dyed with the dye 13 is higher than the glass-transition temperature of the dye 13. The sublimation temperature of the dye 13 is higher than the dyeing temperature of the dye 13. The temperature of the after-heater 36 is set to be equal to or higher than the glass-transition temperature of the dye 13 and be lower than the sublimation temperature of the dye 13. Also, as the thermoplastic resin, a thermoplastic resin having a glass-transition temperature lower than the glass-transition temperature of the dye 13 is selected.

As described above, since the thermoplastic resin is dyed by the dye 13, and then is temporarily liquefied by heating, thereby being fixed to a medium 20, the dye printing method according to the present embodiment can perform printing on media 20 regardless of the types of the media 20. Therefore, the dye printing method according to the present embodiment can perform printing on more types of media 20 than in the related art.

In the dye printing method according to the present embodiment, since the thermoplastic resin is dyed in advance with the dye, and then is temporarily liquefied by heating, thereby being fixed to a medium 20, a pretreatment process using a pretreatment agent is unnecessary, unlike in the dye printing method of the related art. Therefore, as compared to methods in which pretreatment processes are performed, the dye printing method according to the present embodiment can reduce the total time of processing, and can reduce the cost by the cost of a pretreatment agent for a pretreatment process. Further, since any pretreatment agent is not used, the dye printing method according to the present embodiment does not need a process of washing a pretreatment agent out.

In the dye printing method according to the present embodiment, since the dye is at the molecular level and is uniformly dispersed in the particles 52, the particles 52 are completely dyed with the dye. In other words, in the dye printing method according to the present embodiment, the dye is uniformly dispersed before start of printing. Therefore, in the dye printing method according to the present embodiment, since the particles 52 of the thermoplastic resin including the dye do not need to be formed in the procedure of emulsion polymerization or the like when the ink 50 is produced, it is possible to facilitate production of the ink 50. Therefore, the dye printing method according to the present embodiment decreases, for example, the production cost of the ink 50.

Since the ink 50 which is used in the dye printing method according to the present embodiment contains the large particles 52 of the thermoplastic resin including the dye 13, as compared to a configuration in which the dye is directly dispersed in the solvent 11, the degree of freedom of movement of the dye in the solvent 11 is low. Therefore, the dye printing method according to the present embodiment can suppress the dye from spreading into a medium 20 together with the solvent of the ink 50 ejected to the medium 20, and can obtain a printed result with high accuracy and high concentration.

Also, in the dye printing method according to the present embodiment, since dyeing is performed with the dye which is more transparent than pigments and is highly vivid, it is possible to obtain highly vivid printed results as compared to methods of performing dyeing with pigments.

Also, in the dye printing method according to the present embodiment, for example, even in a case where a fabric is used as a medium 20, since a color development layer 14 is formed of the thermoplastic resin on the surface of the fabric without dyeing the inside of the fabric, it is possible to obtain a highly vivid printed result with high concentration.

Also, since the dye printing method according to the present embodiment does not need to include a pressing process, it is possible to perform printing even on media 20 on which printing is difficult in a case of including a pressing process, such as various plastic films, plates, and three-dimensional objects.

However, the dye printing method according to the present embodiment can also press a medium 20 having a color development layer 14 formed thereon with a roller and the like, thereby flattening the surface of the color development layer, thereby capable of obtaining gloss by the color development layer 14.

Also, the resin fixing process of S63 is performed in the inkjet printer 30 in the present embodiment; however, it may be performed by a device different from the inkjet printer 30 after a medium 20 is taken out of the inkjet printer 30.

Also, the particle fixing process of S62 may be performed by a device different from the inkjet printer 30 after a medium 20 is taken out of the inkjet printer 30.

Third Embodiment

A dye printing method according to a third embodiment of the present invention is different from the dye printing method according to the first embodiment, only in ink which is used.

<Ink>

Figure 8:
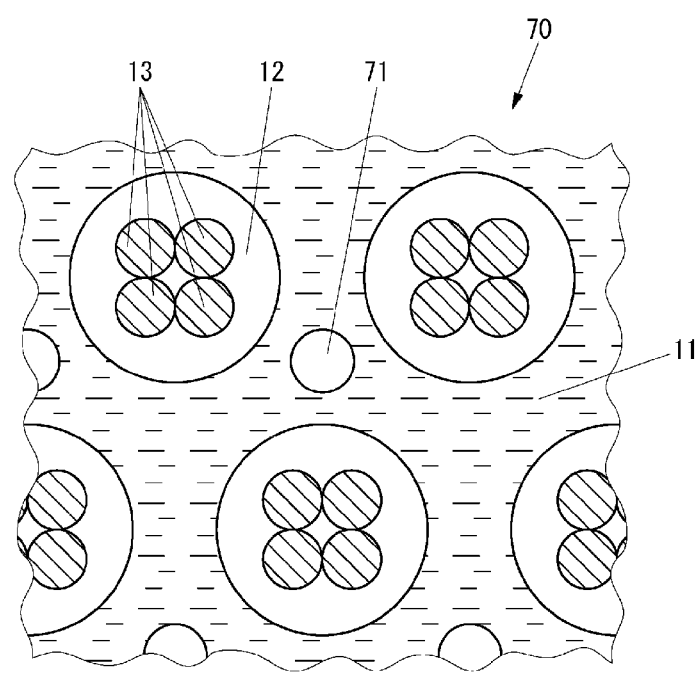
FIG. 8 is a view schematically illustrating the composition of ink which is used in a dye printing method according to a third embodiment of the present invention.

FIG. 8 is a view schematically illustrating the composition of ink 70 which is used in the dye printing method according to the present embodiment.

As shown in FIG. 8, the ink 70 contains a solvent 11 composed of water, a dissolving agent, and dispersants, particles 12 of a thermoplastic resin dispersed in the solvent 11, and small particles 71 of a thermoplastic resin dispersed in the solvent 11 and having a particle diameter smaller than that of the particles 12. The water, the solvent, and the dispersants are identical to the water, the solvent, and the dispersants of the first embodiment.

(Small Particles)

As the thermoplastic resin constituting the small particles 71, resins having high thermoplasticity, such as polyester, polyurethane, polyvinyl acetate, and latex can be used.

The glass-transition point of the small particles 71 is lower than that of the particles 12. Also, the small particles 71 are dyed in a color identical or similar to the color of the particles 12 having the dye 13 uniformly dispersed therein.

The ratio of the small particles 71 in the ink is 2% to 25% by volume, preferably, 5% to 20% by volume.

The small particles 71 come between the particles 12, thereby preventing air from entering therebetween, resulting in bubble prevention, and improving the adhesion and adhesive force between the particles 12 and between the particles 12 and a base material. To this end, the small particles need to become soft earlier than the particles 12. Therefore, the small particles 71 have the following properties.

(1) The glass-transition temperature of the small particles 71 is lower than at least the glass-transition temperature of the particles 12.

(2) The glass-transition point of the small particles 71 is lower than the drying temperature of the printer (the temperature of the print heater 34 and the after-heater 36). Preferably, the temperature of the print heater 34 is between 45° C. and 60° C.

<Dye Printing Method>

Now, the dye printing method according to the present embodiment will be described.

Figure 9A:
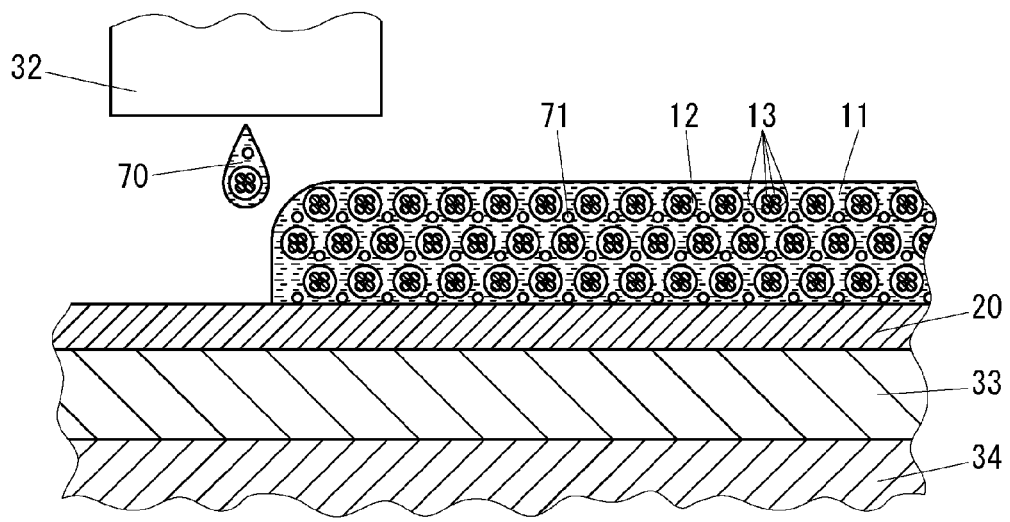
FIG. 9A to 9C are side views illustrating a medium at different time points in the dye printing method according to the third embodiment of the present invention.
Figure 9B:
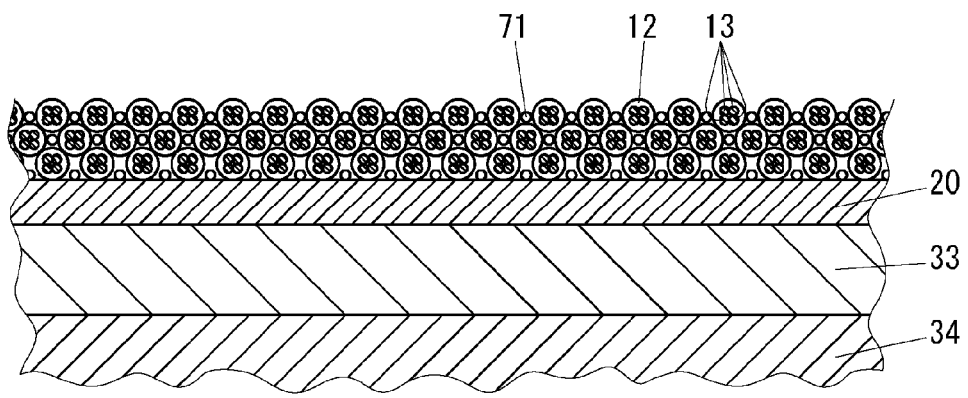
Figure 9C:
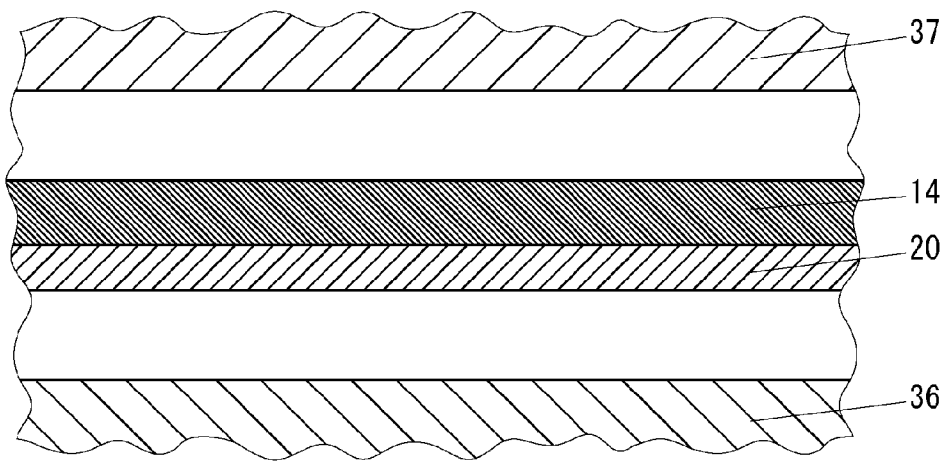

FIG. 9A to 9C are side views of a medium 20 at different time points in the dye printing method according to the present embodiment.

First, the printing process of S41 will be described.

In printing process of S41, first, as shown in FIG. 9A, printing is performed on the medium 20 with the ink 70 by the inkjet head 32.

Now, the particle fixing process of S42 will be described.

In the particle fixing process of S42, the medium 20 subjected to printing with ink 70 is heated by the print heater 34, whereby the solvent 11 of the ink 70 is vaporized, whereby the medium is dried. Therefore, the particles 12 and the small particles 71 are fixed to the medium 20 as shown in FIG. 9B. In the state shown in FIG. 9B, since the solvent 11 has been vaporized, the particles 12 and the small particles 71 are suppressed from spreading along the medium 20.

Now, the resin fixing process of S43 will be described.

In the resin fixing process of S43, the medium 20 having the particles 12 and the small particles 71 fixed thereto is heated between 100° C. and 200° C. by the after-heater 36 and the fan heater 37 for about several minutes to several tens minutes, whereby the particles 12 and the small particles 71 fixed to the medium 20 are temporarily liquefied by the heating and the dye 13 is uniformly dispersed by the heating.

Here, if the particles 12 and the small particles 71 fixed to the medium 20 are liquefied, the thermoplastic resins constituting the particles 12 and small particles 71 are re-solidified by cooling, thereby being fixed to the medium 20. Therefore, on the medium 20, as shown in FIG. 9C, a color development layer 14 is formed of the thermoplastic resin dyed with the dye 13.

Now, the heating temperature of the after-heater 36 will be described. The glass-transition temperature of the particles 12 is higher than the glass-transition temperature of the small particles 71. The glass-transition temperature of the dye 13 is higher than the glass-transition temperature of the thermoplastic resin of the particles 12. A dyeing temperature which is a temperature at which the thermoplastic resin is dyed with the dye 13 is higher than the glass-transition temperature of the dye 13. The sublimation temperature of the dye 13 is higher than the dyeing temperature of the dye 13. The temperature of the after-heater 36 is set to be equal to or higher than the dyeing temperature of the dye 13 and be lower than the sublimation temperature of the dye 13. Also, as the thermoplastic resin of the particles 12, a thermoplastic resin having a glass-transition temperature lower than the dyeing temperature of the dye 13 is selected, and as the thermoplastic resin of the small particles 71, a thermoplastic resin having a glass-transition temperature lower than the glass-transition temperature of the thermoplastic resin of the particles 12 is selected.

As described above, since the small particles 71 are disposed between the particles 12 dispersed in the solvent 11, whereby it is possible to reduce the concentration of the solvent, it is possible to increase the viscosity of the ink 70 by vaporization of a smaller amount of solvent 11. Therefore, it is possible to more quickly suppress bleeding of the ink 70 ejected to a medium 20.

Also, after the particle fixing process of S42, the ink 70 becomes a state where the small particles 71 have been disposed between the particles 12. Therefore, after the resin fixing process of S43, it is easy for the surface of the color development layer 14 to be flattened.

Therefore, it is possible to obtain a high-gloss printed result with the ink 70.

Also, in a case where a medium 20 is formed of a material having an uneven surface, such as a fabric, since the small particles 71 of the ink 70 easily enter hollows in the surface of the medium 20, it is possible to improve the adhesive strength of a color development layer 14 to the medium 20 and the smoothness of the surface.

In the ink 70, since the glass-transition point of the small particles 71 is lower than that of the particles 12, after the particle fixing process of S42, the mixture of the particles 12 fixed to the medium 20 and the small particles 71 is thermally plasticized at a temperature lower than the glass-transition point of the particles 12. Therefore, it is possible to lower a temperature at which it is possible to fix the thermoplastic resin particles of the ink 70 to a medium 20 in the resin fixing process of S43.

Also, in the ink 70, the glass-transition point of the small particles 71 may be equal to or higher than the glass-transition point of the particles 12.

Since the small particles 71 are dyed in a color identical or similar to the color of the particles 12 having the dye 13 uniformly dispersed therein, it is possible to suppress the dyeing concentration of a result of printing using the dye 13 contained in the particles 12 from decreasing due to the color of the small particles 71. Therefore, the ink 70 becomes high-concentration ink.

Also, in the ink 70, the small particles 71 may not be dyed in a color identical or similar to the color of the particles 12 having the dye 13 uniformly dispersed therein. For example, the small particles 71 may be colorless and transparent.

The dye printing method according to the present embodiment is a method devised by adding the small particles 71 to the ink 10 (see FIG. 1) in the dye printing method according to the first embodiment. Similarly, the small particles 71 may be added to the ink 50 (see FIG. 5) in the dye printing method according to the second embodiment.

Also, in the resin fixing process of each embodiment described above, the particles of the thermoplastic resin are temporarily liquefied by heating, thereby being fixed to a medium. However, in a case where the particles of the thermoplastic resin are heated at least at the glass-transition temperature or higher in the resin fixing process, the particles of the thermoplastic resin may not be liquefied for being fixed to a medium. For example, if the particles of the thermoplastic resin are heated at the glass-transition temperature or higher, thereby becoming a glass state, and then are pressed against a medium, some of the particles get stuck in hollows of the surface of a medium, whereby the particles can be fixed to the medium.

The invention claimed is:

1. A dye printing method using ink including a solvent, and particles of a thermoplastic resin dispersed in the solvent and including a dye, wherein the dye is included in the particles of the thermoplastic resin in a state of not being uniformly dispersed, comprising:

a particle fixing process of fixing the particles of the thermoplastic resin to the medium by drying the solvent of the ink ejected to the medium by the printing process; and a first resin fixing process of fixing the thermoplastic resin to the medium by heating the particles of the thermoplastic resin fixed to the medium by the particle fixing process at least at a glass-transition temperature or higher, wherein after the first resin fixing process, the particles of the thermoplastic resin are brought into a liquid state with a dye color developing process of uniformly dispersing the dye by heating, wherein after the dye color developing process, a second resin fixing process of cooling the thermoplastic resin to bring the thermoplastic resin to be re-solidified into a solid state and fixed to the medium.

2. The dye printing method according to claim 1, wherein:

the ink further comprises small particles of a thermoplastic resin dispersed in the solvent and having a particle diameter smaller than that of the particles.

3. The dye printing method according to claim 2, wherein the small particles have a glass-transition point lower than that of the particles.

4. The dye printing method according to claim 2, wherein the small particles are dyed in a color identical or similar to the color of the particles including the dye uniformly dispersed therein.

* * * * *